United States Patent
Deck et al.

[11] Patent Number: 6,005,477
[45] Date of Patent: Dec. 21, 1999

[54] METHOD AND APPARATUS FOR INFORMATION TRANSMISSION VIA POWER SUPPLY LINES

[75] Inventors: Bernhard Deck, Weilheim; Josef Lehmann, Waldshut-Tiengen, both of Germany; Stefan Ramseier, Birr, Switzerland; Oddleif Westby, Gjettum, Norway

[73] Assignee: ABB Research Ltd., Zurich, Switzerland

[21] Appl. No.: 09/060,199

[22] Filed: Apr. 15, 1998

[30] Foreign Application Priority Data

Apr. 17, 1997 [DE] Germany ............................ 197 16 011

[51] Int. Cl.$^6$ ....................................................... H04B 1/00
[52] U.S. Cl. ................................. 340/310.02; 340/310.01; 340/310.06; 340/310.03; 375/259; 375/262
[58] Field of Search ...................... 340/310.01, 310.02, 340/310.03, 310.07, 310.06; 375/259, 262; 455/3.3

[56] References Cited

U.S. PATENT DOCUMENTS

| | | | |
|---|---|---|---|
| 4,577,333 | 3/1986 | Lewis et al. | 340/310.02 |
| 4,809,296 | 2/1989 | Braun et al. | 375/259 |
| 5,185,591 | 2/1993 | Shuey | 340/310.02 |
| 5,243,627 | 9/1993 | Betts et al. | 375/262 |
| 5,400,322 | 3/1995 | Hunt et al. | 370/121 |
| 5,535,220 | 7/1996 | Kanno et al. | 370/107 |
| 5,583,889 | 12/1996 | Citta et al. | 375/341 |
| 5,596,604 | 1/1997 | Cioffi et al. | 375/259 |

FOREIGN PATENT DOCUMENTS

0238813B1 9/1987 European Pat. Off. .

OTHER PUBLICATIONS

"IEEE Guide for Power-Line Carrier Applications", IEEE publication Std 643-1980, Jan. 30, 1981.

*Primary Examiner*—Donnie L. Crosland
*Attorney, Agent, or Firm*—Burns, Doane, Swecker & Mathis, L.L.P.

[57] ABSTRACT

A method and a system for rapid and interference-free data communication via power supply networks at any voltage levels. The combined effects of interference from signal distortion, frequency-selective signal attenuation or noise and from pulsed interference is reduced by using an MCM multicarrier modulation method. By combining the MCM method with a specially adapted interleaver (data scrambler) and error-protection coding, the error rates can be drastically reduced and the transmission rates can be increased to considerably more than 2 kbit/s.

13 Claims, 2 Drawing Sheets

METHOD AND APPARATUS FOR INFORMATION TRANSMISSION VIA POWER SUPPLY LINES

This application claims priority under 35 U.S.C. §§119 and/or 365 to No. 197 16 011.5 filed in Germany on Apr. 17, 1997; the entire content of which is hereby incorporated by reference.

BACKGROUND OF THE INVENTION

FIELD OF THE INVENTION

The present invention relates to the field of data communication via electricity lines at the low, medium and high-voltage levels. It is based on a method and a system for data transmission via a power supply network.

DISCUSSION OF BACKGROUND

The invention relates to a method and an apparatus for rapid, reliable information transmission via power supply networks at any voltage levels. The use of these existing networks for data communication is of major economic importance. Electricity supply companies, for example, wish to interrogate and remotely control power supply network facilities without installing new lines, or to optimize the utilization of the network by remote interrogation and control of end users. Existing lines may also be used as information channels, or may be offered to third parties. However, a major impediment to such applications is the fact that electricity and power supply networks have very poor transmission characteristics as communication channels and are subject to severe, unavoidable electromagnetic interference.

The invention refers to a prior art as has been disclosed, for example, in European Patent Specification EP 0 238 813 B1. This document discloses a method for data transmission via power supply lines which, in particular, combats the time-selective and frequency-selective fading phenomena in the transmission channel. For this purpose, the information is transmitted a number of times by producing identical information units, symbols or bit words by replication and by transmitting them at a sufficient time interval at different carrier frequencies. In this case, transmissions are always made on only a single carrier frequency, which is varied pseudo-randomly, using a frequency hopping, or FH, method. The carrier frequency modulation is preferably carried out using a phase shift keying, or PSK, method or binary phase shift keying, or BPSK, method, which methods are likewise known. In addition, transmission-dependent symbol corruption can be corrected by means of error-protection coding. The coding is preferably carried out using a so-called forward error correction code, which is known from the literature.

The disadvantages of this method include the limited transmission rate or bit rate resulting from the FH method. In general, conventional methods cannot reliably avoid transmission errors caused by combinations of typical interference on the line. For example, a permanent narrowband interference source can completely swamp the transmission of a first symbol at the corresponding carrier frequency, and pulsed interference can make it impossible to transmit the duplicated symbol, despite the use of a different carrier frequency.

According to U.S. Pat. No. 5,185,591, it is furthermore prior art for the identically replicated information to be transmitted simultaneously at a number of carrier frequencies for data communication via power supply lines. The intention of this procedure is to distribute destructive interference caused by standing waves on the line at the various transmission frequencies so that an adequate signal strength can be received at any point on the line. The PSK method, a so called frequency shift keying (FSK) method or an on/off key modulation method is proposed for carrier modulation. However, the extremely low bit rate of typically <100 bits per second (bits/s) makes this form of multiple transmission highly unattractive.

Furthermore, U.S. Pat. No. 4,577,333 discloses a data transmission system for channels with severe electromagnetic interference, such as power supply lines. A composite shift keying (CSK) modulation method is proposed in order to improve the FSK, PSK or a so-called amplitude shift keying (ASK) method. In this case, the bit values 0 and 1 are allocated two frequencies and the transmission of one of the two frequencies is confirmed by an accompanying third frequency. This redundancy, in combination with data block transmission protocols, is used for error identification and correction. Obviously, the limitation to only three fixed carrier frequencies in this case places a considerable limitation on the availability and reliability, as well as the transmission capacity, of the electrical power line as an information channel.

Methods for point-to-point communication on high-tension lines have been published, for example, in "IEEE guide for power-line carrier applications" (Author: Power System Communications Committee of the IEEE) by the Institute of Electrical and Electronic Engineering, New York (1981) under the Report Number ANSI/IEEE Std 643-1980. In the case of point-to-point communication, the transmission system can be matched to the characteristics of the channel, but the flexibility is correspondingly limited.

A special multicarrier modulation method has been disclosed, for example, by J. A. Bingham, "Multicarrier Modulation for Data Transmission: An Idea whose Time Has Come", IEEE Communications Magazine Vol. 28, May 1990, under the name "multicarrier modulation", or MCM method. The data are transmitted in parallel form at a high overall transmission rate on a plurality of sub-bands at different carrier frequencies. MCM is robust against so-called "intersymbol interference" or signal distortion and against narrowband interference sources, but not against pulsed interference. Until now, MCM has been used for telephone modems or for wire-free information channels such as digital broadcast satellite radio and mobile radio.

The interference susceptibility of digital transmission systems can be further improved by interleaving, that is to say scrambling the data to be transmitted, in combination with error correction. Transmission errors in the information reconstructed at the receiving end are then scattered so widely that they can be corrected. A summary of such methods can be found, for example, in B. Sklar, "Digital Communications", pages 357 ff, Prentice Hall, Englewood Cliffs, 1988.

SUMMARY OF THE INVENTION

Accordingly, one object of the invention is to provide a novel method and system for information transmission via power supply networks, which provides an information link with improved transmission quality, in particular with high availability, low error rate and high data rate, largely independently of the transmission characteristics of the network and its electromagnetic interference.

Specifically, the essence of the invention is to combine a multicarrier modulation method with a special interleaver, the interleaver reordering the data in order to separate adjacent data in time and thus to neutralize pulsed interference in conjunction with error protection coding, and the modulator splitting the data between parallel transmission channels with a number of carrier frequencies in order to achieve high data rates and low sensitivity to frequency-selective interference and signal distortion.

A first exemplary embodiment provides a schematic illustration of a unidirectional information link via an electrical power line between two subscribers.

Three further exemplary embodiments describe a transmitter, modulator and receiver design for implementing the data transmission method according to the invention.

One advantage of the invention is that it provides very fast data transmission, which is nonetheless extremely insensitive to interference, via electrical power distribution networks.

Specifically, it is advantageous that the transmission interference that is typical of electrical power distribution networks is largely neutralized, even in terms of the combined effect of such interference.

A further advantage is the high level of independence of the transmission method according to the invention from the transmission characteristics of the electrical power distribution network. In consequence, data communication is feasible at any desired voltage levels and with different configurations and operating modes of the network, with any desired number of unidirectional or bidirectional communications subscribers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
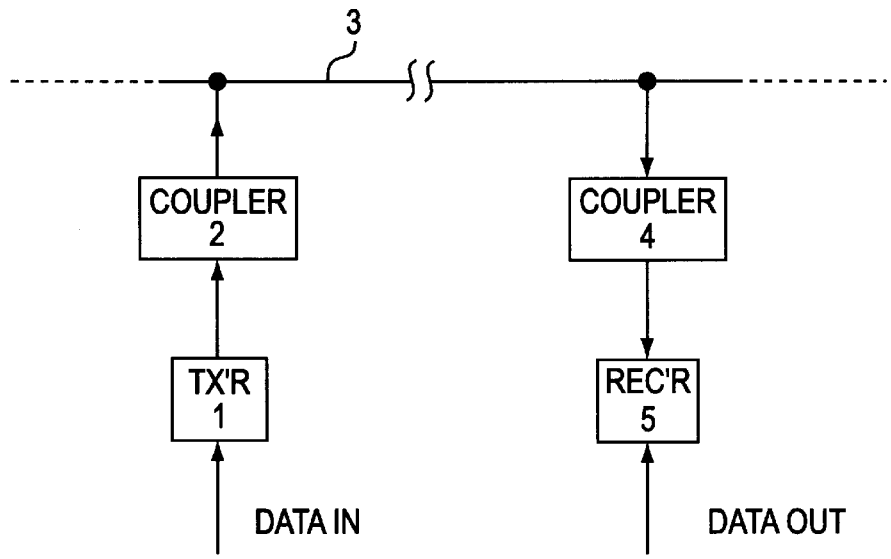
FIG. 1 shows the schematic arrangement of a transmission system for carrying out the method according to the invention, with one transmitter and one receiver.

Referring now to the drawings, wherein like reference numerals designate identical or corresponding parts throughout the several views, typical interference on power supply networks will be analyzed first of all, and exemplary embodiments will then be used to show how the invention can largely neutralize interference influences on signal transmission.

The amplitude and phase of the signals in the network are varied as a function of frequency and time, with additional noise signals being superimposed on these signals. This results in three main interference sources:
1. Signal distortion (intersymbol interference)
2. Narrowband signal attenuation or narrowband noise (narrowband jammer),
3. Brief, broadband pulsed interference (spiky noise).

Distortion can lead to symbols transmitted close to one another in time overlapping and no longer being exactly identifiable on reception. Narrowband spectral signal absorption can be caused by standing waves resulting from echoes, resonance or the like. The noise signals concentrated in a narrow frequency band often act as a permanent interference source. On the other hand, pulsed interference may briefly adversely affect the entire transmission over a wide frequency band.

On such a poor information channel, conventional modulation methods have to make unacceptable compromises in terms of the data transmission and data error rates and cannot achieve the object described here. In addition to the slow multicarrier methods cited above, frequency keying (the FSK method) is often used on its own. The advantages of FSK are the low receiver structure complexity and the immunity to distortion at low data transmission rates. However, FSK is very sensitive to narrowband interference and to pulsed interference. Other methods use spread spectrum modulation (direct sequence spread spectrum or frequency hopping spread spectrum) Such methods are relatively robust against distortion and interference, but can achieve only a comparatively low data transmission rate for a given bandwidth.

The invention therefore for the first time proposes that the MCM method be used for information interchange via power supply networks and be further developed such that sufficiently interference-free transmission results, without any loss of speed.

With regard to the detailed method of operation of the MCM method and possible carrier modulation methods (FSK, PSK, ASK, etc.), reference is made here to the documents by J. A. Bingham and B. Sklar cited in the introduction. One important characteristic of the MCM method is the reduction in signal distortion for a constant overall data rate as the number of carrier frequencies, sub-bands and channels increases. Specifically, if there are a number of channels, the symbol length can be increased and the bit rate in each channel can be reduced. Signal distortion can be eliminated completely by introducing time guard intervals between the transmission of individual symbols. The guard interval may also be filled by a so-called cyclic prefix, in which the last part of a symbol is placed in front of the symbol, as a prefix. This method is described, for example, in J. S. Chow et al., "A Discrete Multitone Transceiver System for HDLS Applications", IEEE Journal on Selected Areas in Communications, Vol. 9 No. 6, pages 895–908, August 1991. The robustness against narrowband interference can also be improved by suitable error correction. However, MCM per se is invariably still susceptible to pulsed interference, which temporarily interferes with communication on a number of carriers, or even leads to a brief interruption in transmission on all carriers. This susceptibility can be partially overcome at the expense of the overall transmission rate or by using error protection coding.

The invention solves this problem more effectively, even for high data transmission rates of 2 Kbit/s and above, by providing a new interleaving method which is adapted to the MCM method such that immunity to all three types of interference is achieved in combination with error protection coding. In B. Sklar, "Digital Communications", page 357 ff., a distinction is drawn for conventional interleavers between block interleavers and convolution interleavers. In block interleavers, data are read into a matrix in columns and are read out again in lines. In convolution interleavers, data are regrouped by reading into and out of shift registers of different lengths. In contrast, the interleaver according to the invention represents a generalized block interleaver in which, once the matrix has been filled line-by-line, the lines are interchanged before the columns are then read out. In the exemplary embodiments, the exact interleaver rule is described, together with its interaction with the MCM method and error protection coding.

FIG. 1 shows the basic, schematic arrangement for a transmission system as is used to carry out the method according to the invention. The data to be transmitted are passed to the data input of the transmitter (1) where they are modulated onto a suitable carrier frequency before being passed via a first coupling element (2), for example a coupling capacitor, to a network line (3) of a power supply network. The network line (3) may be part of the low-, medium- or high-voltage level of the power supply network. For simplicity, other parts of the electrical power network, such as substations, have been omitted from the figure. The modulated carrier frequency is transmitted via the network line (3) to a receiver (5) which is coupled via a second coupling element (4), not necessarily of the same type as the coupling element (2), to the network line (3). In the receiver (5), the data are recovered by demodulating the received signal and are available at a data output, for further processing.

Figure 2:
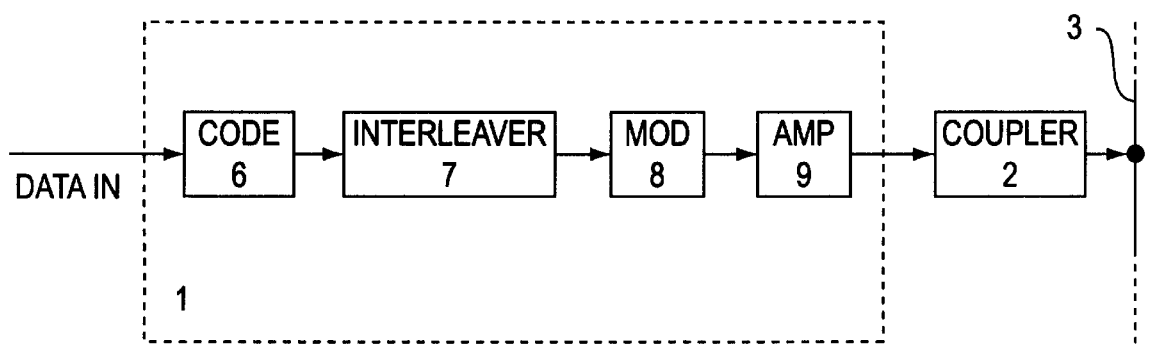
FIG. 2 shows the internal design of a transmitter according to FIG. 1 for a preferred embodiment of the method.

The internal design of the transmitter (1) from FIG. 1, as is suitable for a preferred embodiment of the method, is shown in FIG. 2. The data to be transmitted are first of all passed within the transmitter (1) to a coder (6), which preferably operates using a forward error correction code. Details of the code and the coder may be found, for example, in the book cited initially by B. Sklar or in W. Peterson and E. Weldon, "Error Correcting Codes", MIT Press, Cambridge, USA, 1972. The coding of data is based on providing redundancy, for example by convolution coding or insertion of control data. The data that result from the coding process are then scrambled in an interleaver (7). This results in data which were previously close to one another now being well away from one another. The details of the operation are described with reference to the de-interleaver (16). The reordered data pass from the interleaver (7) to the modulator (8) where they are modulated according to the invention, using multicarrier modulation (MCM).

Figure 3:
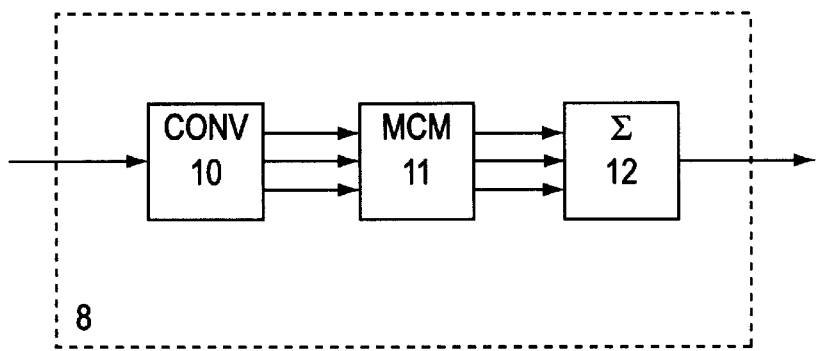
FIG. 3 shows the internal design of a modulator for the transmitter according to FIG. 2.

The detailed design of the modulator (8) is illustrated in FIG. 3. In the following description, it is assumed that a number of carrier frequencies are used which can be chosen as required, for example are orthogonal to one another and, in particular, are equidistant in a frequency range between 20 kHz and several 100 kHz. The data to be modulated are first of all converted in a serial/parallel converter (10) into parallel sub-symbol streams. A sub-symbol may in this case contain one or more bits. These sub-symbol streams are modulated in parallel form onto a number of channels in the MCM modulator (11) and are joined together in the adder (12). One possible implementation of the modulator (8) is described in the article by J. A. Bingham cited in the introduction, and is based on an inverse Fast Fourier Transformation. The modulated signal is finally passed to a downstream power amplifier (9) and is then injected via the coupling element (2) into the network line (3).

Figure 4:
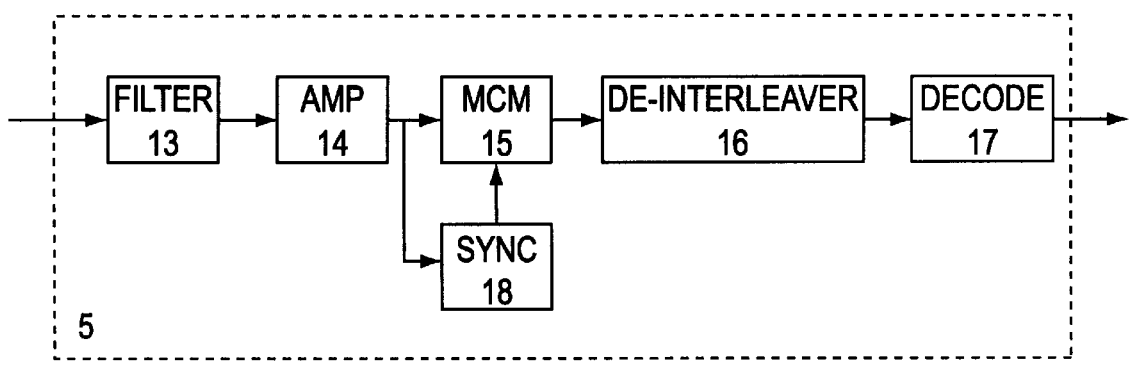
FIG. 4 shows the internal design of a receiver according to FIG. 1, refined for matching to the transmitter according to FIG. 2.

One possible implementation of the receiver (5) is shown in FIG. 4. The received signal is picked off from the network line (3) via the coupling element (4), is separated from other, interference frequencies in a frequency filter (13), and is amplified in a variable gain amplifier (14). The amplifier is followed by an MCM demodulator (15) which demodulates the signal modulated according to the invention back to the baseband again. The structure of the demodulator depends, inter alia, on the number of modulated channels, and may preferably be carried out by a discrete Fourier transformation, a fast Fourier transformation or a Goertzel transformation. The information required for demodulation relating to synchronization of the data block transmission between the transmitter and receiver is produced in a synchronization circuit (18). The demodulated signal is scrambled in a de-interleaver (16). such that the reordering produced in the interleaver (7) is reversed. Finally, on the output side, the receiver (5) also has a decoder (17) which converts the data coded using the forward error correction code back into uncoded data again. For decoding, a Viterbi decoder may be used, in particular, for a convolution code. This allows the error rate to be reduced considerably.

The aim of the scrambling in the interleaver (7) and de-interleaver (16) is to distribute the errors produced by the transmission channel such that the damage to the information transmission is limited and, in particular, a forward error correction code is optimally effective. If a convolution code is used, the minimum distance between two erroneous data items at the input of the decoder (17) should be as great as possible, that is to say the erroneous data items should be distributed uniformly, and should not occur in bursts. Such error bursts on the network line (3) are caused by narrowband interference and pulsed interference. The MCM modulation method used, in which the data to be transmitted are preferably combined, as described further below, to form individual symbols, has the desirable characteristic of distributing narrowband interference uniformly in the demodulated data stream. However, pulsed interference leads to an error burst at the output of the demodulator (15). The combination of an interleaver (7) and de-interleaver (16) is therefore intended to operate such that the errors resulting from the two types of interference are uniformly distributed at the output of the de-interleaver (16).

Conventional block or convolution interleavers do not satisfy the specific requirements and lead to an undesirably high error rate. This serious disadvantage can be overcome by using the method according to the invention. For this purpose, the data to be transmitted are split into blocks of P sub-symbols (P=data block length). A sub-symbol in this case means those data items which are transmitted within one symbol on one MCM channel. The individual sub-symbols at the input of the interleaver (7) and at the output of the de-interleaver (16) are called ordered sub-symbols and are numbered successively from I=0, 1, . . . P−1. The individual sub-symbols at the output of the interleaver (7) and at the input of the de-interleaver (16) are called scrambled sub-symbols, and are numbered successively from J=0, 1, . . . P−1. I and J thus represent the sequence of the ordered and scrambled sub-symbols.

The reordering rules according to the invention for the interleaver (7) and the de-interleaver (16) are:

$$J(I) = (K_1 \cdot I) \bmod (P) \quad (1)$$

$$I(J) = (K_2 \cdot J) \bmod (P) \quad (2)$$

where $K_1$ and $K_2$ are positive integers, for which:

$$(K_1 \cdot K_2) \bmod (P) = 1. \quad (3)$$

The last condition means that $K_1$ and $K_2$ cannot be divided by P. This ensures that all the ordered sub-symbols are mapped uniquely onto the scrambled sub-symbols, and that the operation carried out by the de-interleaver (16) is precisely the opposite of that carried out by the interleaver (7). This interleaver is a generalized block interleaver. The individual sub-symbols are read in columns into a matrix having $K_1$ lines and $K_3$ columns, $K_3$ being the smallest integer greater than or equal to $P/K_1$, the lines are interchanged and the sub-symbols are then read outline-by-line.

For optimum operation of the interleaver in combination with the MCM modulation method, it is furthermore assumed that a block is coded into N symbols of M sub-symbols (M=number of sub-symbols per symbol, P=M·N), the first symbol containing the scrambled sub-symbols J=0, 1 . . . M−1, the second symbol containing the scrambled sub-symbols M, M+1, . . . 2M−1 etc., and that the number of channels for the MCM method is chosen to be equal to M, the scrambled sub-symbols in a block being mapped in a defined sequence onto the MCM channels. Equation (3) then states that $K_1$ and $K_2$ cannot be divided by M or N. All possible implementations of the de-interleaver (16) which satisfy the conditions (1)–(3) have the characteristic that they uniformly distribute the errors produced by a narrow-band interference source over the datastream at the output of the de-interleaver (16). If all the sub-symbols in one of the M channels are subject to interference at the input of the de-interleaver (16), then these errors occur at the output of the de-interleaver (16) with the maximum possible interval M. The structure of the interleaver thus guarantees that, with the MCM method, the sub-symbols in a symbol are transmitted on different sub-bands, despite the scrambling. For this reason, the interleaver is compatible with the MCM method.

The numbers $K_1$ and $K_2$ are advantageously chosen such that the errors produced by pulsed interference are also distributed to the maximum extent, that is to say such that the minimum interval between two errors is maximized. This is done by numerical optimization for given values of M and N. As an example, it is assumed that the MCM method has M=8 channels, and N=16 such symbols are combined in a data block, so that each block contains M·N=128 sub-symbols. Numerical optimization leads to the solution $K_1$=17 and $K_2$=113, that is to say $$\text{Interleaver: } J(I)=(17 \cdot I) \mod 128, \quad (4)$$

$$\text{De-interleaver: } I(J)=(113 \cdot J) \mod 128. \quad (5)$$

As a consequence, errors caused by narrowband interference sources are distributed at an interval of 8 sub-symbols, and block errors produced by a pulsed interference source are distributed such that the minimum distance between two errors is 15. This is very close to an upper limit, which is N=16, but presumably cannot actually be reached.

In summary, it can be said that, on the one hand, the invention makes use of the advantages of the MCM method in terms of interference immunity and transmission rate for a new transmission channel and, on the other hand, a further considerable improvement is achieved by means of a new interleaver and error protection coding. Overall, the invention provides a method for data transmission in power supply networks, in which the influence of network-specific interference on the transmission is considerably reduced, and a high data rate can nevertheless be achieved.

Obviously, numerous modifications and variations of the present invention are possible in the light of the above teachings. It is therefore to be understood that, within the scope of the appended claims, the invention may be practiced otherwise than as specifically described herein.

What is claimed is:
1. The method for data transmission via a power supply network between a transmitter and a receiver, which method comprises the following steps:
 a) interleaving of a data block of length P at a transmission end, by conversion of an ordered sub-symbol sequence I=0, 1, . . . P−1 into a scrambled sub-symbol sequence J=0, 1, . . . P−1 (I, J, P=positive integers) and
 b) modulation of carrier frequencies with the scrambled sub-symbol sequence as well as
 c) reproduction of the ordered sub-symbol sequence at a receiving end by demodulation and de-interleaving,
wherein
 d) an MCM multicarrier modulation method is used, parallel sub-symbol streams being formed from a serial data stream to be transmitted, and a plurality of channels being modulated by these sub-symbol streams,
 e) the interleaving being carried out in accordance with a rule $J(I)=(K_1 \cdot I) \mod (P)$, and the de-interleaving being carried out in accordance with $I(J)=(K_2 \cdot J) \mod (P)$, $K_1$ and $K_2$ being positive integer constants which satisfy a relationship $(K_1 \cdot K_2) \mod (P)=1$.
2. The method as claimed in claim 1, wherein
 a) a data block length is defined to be P=M·N (M, N=positive integers), N designating a number of symbols per block and M designating a number of sub-symbols per symbol, and
 b) the number of channels and the number of parallel sub-symbol streams being chosen to be equal to M.
3. The method as claimed in claim 2, wherein
 a) each sub-symbol of a symbol is transmitted on a different channel,
 b) the number of symbols per block is defined to be N=16, and the number of sub-symbols per symbol is defined to be M=8, and
 c) designated values $K_1$=17 and $K_2$=113 are chosen for the constants $K_1$ and $K_2$.
4. The method as claimed in claim 1, wherein the sub-symbols are error-protection coded at the transmission end, using a forward error correction code, and the uncoded sub-symbols are recovered at the receiving end by decoding, using a Viterbi decoder.
5. The method as claimed in claim 1, comprising a step of:
 providing at least one of time guard intervals between transmission of symbols, and symbols with cyclic prefixes.
6. A system for data transmission via a power supply network which comprises a transmitter having an interleaver and a modulator, and a receiver having a demodulator and a de-interleaver, wherein
 a) the interleaver converts an ordered sub-symbol sequence I=0, 1, . . . P−1 of a data block of length P into a scrambled sub-symbol sequence J=0, 1, . . . P−1 in accordance with a rule $J(I)=(K_1 \cdot I) \mod (P)$ (I, J, P, $K_1$=positive integers)
 b) the modulator receives an output of the interleaver and contains a serial/parallel converter and an MCM multicarrier modulator,
 c) the de-interleaver converts the scrambled sub-symbol sequence back into the ordered sub-symbol sequence in accordance with a rule $I(J)=(K_2 \cdot J) \mod (P)$, ($K_2$= positive integer) and
 d) $K_1$, $K_2$ are constants which satisfy the relationship $(K_1 \cdot K_2) \mod (P)=1$.
7. The system for data transmission via a power supply network as claimed in claim 6, wherein
 a) the transmitter codes a data block of length P=M·N into N symbols of M sub-symbols,
 b) the serial/parallel converter converts a serial data stream to be transmitted into M parallel sub-symbol streams, and c) the MCM modulator produces M channels, modulates the M channels with, in each case, one of the parallel sub-symbol streams, and passes the M channels to an adder.

8. The system for data transmission via a power supply network as claimed in claim 7, wherein
   a) the serial/parallel converter distributes each sub-symbol of a symbol to a different parallel sub-symbol stream,
   b) the number of symbols per block is N=16 and the number of sub-symbols per symbol is M=8, and
   c) the constants $K_1$, $K_2$ assume the designated values $K_1=17$ and $K_2=113$.

9. The system for data transmission via a power supply network as claimed in claim 6, wherein
   a) the transmitter comprises a coder which operates using a forward error correction code, and
   b) the receiver comprises a decoder, which is a Viterbi decoder.

10. The system for data transmission via a power supply network as claimed in claim 6, wherein the transmitter inserts time guard intervals between transmission of symbols, or provides the symbols with cyclic prefixes.

11. The system for data transmission via a power supply network as claimed in claim 6, wherein
    a) the transmitter comprises a power amplifier,
    b) a coupling capacitor or a coupling coil operates as a coupling element between the transmitter and, respectively, the receiver and a network line, and
    c) the receiver comprises at least one of a frequency filter a signal amplifier and a synchronization circuit.

12. The system for data transmission via a power supply network as claimed in claim 6, wherein at least one of a plurality of the transmitter and the receiver are distributed at a multiplicity of communication locations and interchange data via the power supply network.

13. A method or system for data transmission via a power supply network as claimed in claim 6, wherein
    a) carrier frequencies used are orthogonal to one another, equidistant from one another, in a range between 20 kHz and 500 kHz and
    b) the transmission rate is more than 2 kbit/s.

* * * * *